Dec. 12, 1967 E. J. THOMS 3,357,547

RETAINER FOR TAPE ON A REEL

Filed March 14, 1967

United States Patent Office 3,357,547

Patented Dec. 12, 1967

3,357,547

RETAINER FOR TAPE ON A REEL

Edward J. Thoms, 17 Davis Ave.,
Hackensack, N.J. 07601

Filed Mar. 14, 1967, Ser. No. 623,028
10 Claims. (Cl. 206—53)

ABSTRACT OF THE DISCLOSURE

A retainer for retaining tape or the like on a reel having spaced flanges comprises a stem portion and a gripping portion at least one end and preferably at opposite ends of the stem portion. The stem portion has a transverse dimension which is less than the space between the flanges of the reel while the gripping portions are elastically compressible and in uncompressed condition have a transverse dimension greater than the space between the reel flanges. The gripping portions are formed for example of elastomeric sponge or foam material, having the characteristic of gripping the flanges and tape when pressed in between the flanges.

The present invention relates to a retainer for retaining tape on a reel so as to prevent its loosening or unwinding. The term tape is used in a generic sense to include magnetic tape, photographic film, and other tape or ribbon-like materials. The term reel is likewise used in a generic sense to include reels, spools or other forms on which tape is wound.

When tape is initially manufactured and wound on reels, suitable means must be provided for securing the end of the tape to prevent the tape from unwinding or from loosening on the reel. This is frequently done by bringing the tape out over the edge of one of the flanges and securing it by adhesive tape to the outside of the reel. However, this is undesirable because of forming a crease in the tape where it comes out over the edge of the reel flange, and the adhesive tape which is used may leave a sticky deposit on the end portion of the tape or on the reel.

When the tape is later used by the purchaser and is rewound on the reel, it is likewise desirable to have convenient means for securing the end of the tape against unwinding or loosening. A small piece of pressure sensitive adhesive paper is frequently used for this purpose. However, the pressure sensitive adhesive is difficult to use, particularly when the reel is only partly filled, so that it is difficult to reach down between the flanges to secure, or release, the tape. Moreover, the pressure sensitive adhesive tends to dry out and become ineffective after repeated use, and is further undersirable in that it may leave a sticky deposit on the tape.

Various forms of clips have also been proposed for securing the end of tape wound on a reel. However, such clips are relatively expensive, are in general not consistently effective, and may scratch or otherwise damage the tape or reel.

It is an object of the present invention to provide an improved retainer which effectively secures the end of the tape wound on a reel and is inexpensive to manufacture and convenient to use. Moreover, it can be used repeatedly without deterioration and will not leave any deposit on, scratch, or otherwise damage the tape or reel with which it is used.

The tape retainer in accordance with the invention has at least one gripping portion of sponge-like material fitting between the flanges of the reel and engaging the tape, to secure it against unwinding and means unitary with the holding member for manually applying the holding member to and removing it from the tape. In a preferred embodiment the retainer comprises a stem portion for manipulation of the retainer and a gripping portion of sponge material at least one end, and preferably at both ends, of the stem portion. The gripping portion is preferably of elastomeric foam material, for example polyurethane foam.

The objects and advantages of the tape retainer in accordance with the present invention will be more fully understood from the following description and claims, in conjunction with the accompanying drawings, in which preferred embodiments of the invention are illustrated by way of example. In the drawings:

Figure 5:
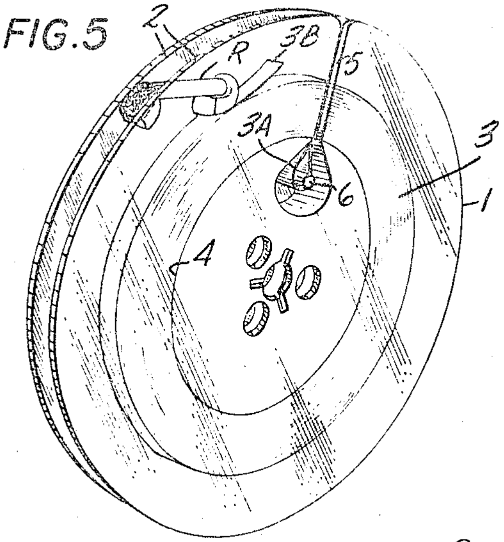
FIG. 5 is a perspective view of a tape reel showing a tape retainer in accordance with the invention in use.

In FIG. 5 there is shown by way of example a reel 1 of the kind used for magnetic tape. The reel has spaced flanges 2 between which a length of tape 3 is wound on a central spool portion 4. One of the flanges is provided with a radially extending slot 5 for insertion of the inner end 3A of the tape which is secured on a pin 6. The outer end 3B of the tape is secured against unwinding or loosening by a retainer R in accordance with the invention.

Figure 2:
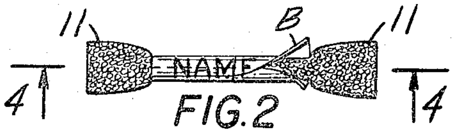
FIG. 2 is a side view of a partially completed tape retainer.
Figure 4:
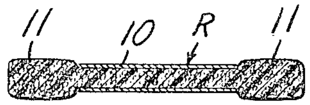
FIG. 4 is a longitudinal section of the tape retainer shown in FIG. 2, but in completed condition.
Figure 9:
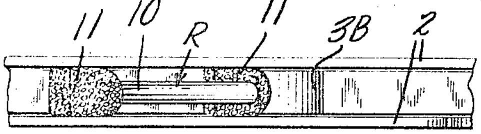
FIG. 9 is an edge view, taken approximately on the line 9—9 in FIG. 7.

As illustrated in FIGS. 2, 4 and 5 the retainer comprises a stem portion 10 and gripping portion 11 at opposite ends of the stem portion. The stem portion is shown as being approximately circular with a diameter which is less than the space between the flanges 2 of the reel 1. While the gripping portions 11 can also be of circular cross section as desired, they are shown as being rectangular and in unconfined condition have a transverse dimension that is greater than the space between the flanges of the reel. However, the gripping portions are formed of elastically compressible material and are compressed in a transverse direction when the retainer is inserted between the flanges of a reel as illustrated in FIGS. 5 to 9. The compression is sufficient to cause the gripping portions to press against opposite flanges of the reel. For example the gripping portions may be compressed to about 50% to 75% of their original transverse dimension. Moreover, the gripping portions 11 of the retainer have the characteristic that when compressed between the flanges of the reel and into contact with the tape, they grip the flanges and tape so as to secure the retainer in position between the flanges and secure the end of the tape against unwinding or loosening.

Figure 1:
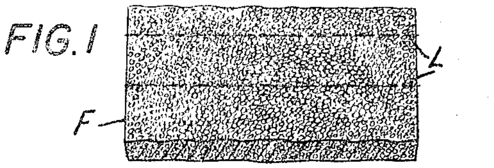
FIG. 1 is a perspective view of cellular foam material used in making a tape retainer in accordance with the invention.

A retainer in accordance with the invention is conveniently and inexpensively made from sponge material, such as that illustrated in FIG. 1, the term sponge material being used in a generic sense to include sponge, foam or cellular materials, for example foam plastic or elestomeric material. The material such as that illustrated at F in FIG. 1 has the characteristic of being elastically compressible so that it can be compressed at least in a transverse direction and is elastically recoverable, so that when compressed, it tends to resume its original size and shape, and hence presses against surfaces confining it. Moreover, the material has the characteristic of frictionally gripping surfaces which it engages so as to resist sliding on such surfaces. A material suitable for use is an elastomeric cellular foam, such as a foam of polyurethane.

Tape retainers in accordance with the invention are conveniently and inexpensively manufactured by cutting a sheet of sponge material F (FIG. 1) along lines indicated by the dotted lines L to form strips having a cross sectional size and shape corresponding to the gripping portions 11 of the retainer. A central portion of the strip is then compressed and confined by a band B to form the stem portion 10 of the retainer. The band B is for example a metal or plastic band which is pressed or molded around the central portion of the strip of sponge material or a paper or fabric band wrapped around the sponge material and secured in place, for example by pressure sensitive or other adhesive. With this construction, both gripping portions 11 are formed of a single piece of sponge material, a central portion of which extends through and is compressed by the band B to form the stem portion 10. The stem portion is stiffened by the band B, so as to be relatively firm and stiff, while the unconfined portions of the sponge material which form the gripping portions 11 are flexible and readily compressible.

Figure 3:
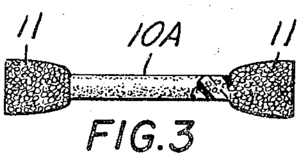
FIG. 3 is a side view of another embodiment of the invention with a portion broken away and shown in section.

In FIGURE 3 there is illustrated another mode of construction in accordance with which a central portion of a strip of sponge material is compressed and stiffened for example by heat molding, to form a stem portion 10A, while end portions are left uncompressed to provide gripping portions 11. This mode of manufacture is particularly economical when forming the retainers from thermoplastic elastomeric foam material. If the material used does not provide sufficient body for the desired firmness and stiffness of the stem portion 10A, additional material is supplied, for example by feeding thermoplastic strip material into the mold by which the stem portion is molded.

The stem portion of the retainer provides a convenient place for displaying a trademark or other identification or indicia. For example with the mode of manufacture illustrated in FIG. 2, the band B can be suitably colored or printed before being applied to the sponge material. With the mode of manufacture illustrated in FIG. 3, identifying characters may be embossed or engraved in the surface of the mold by which the stem portion 10A is formed.

Figure 7:
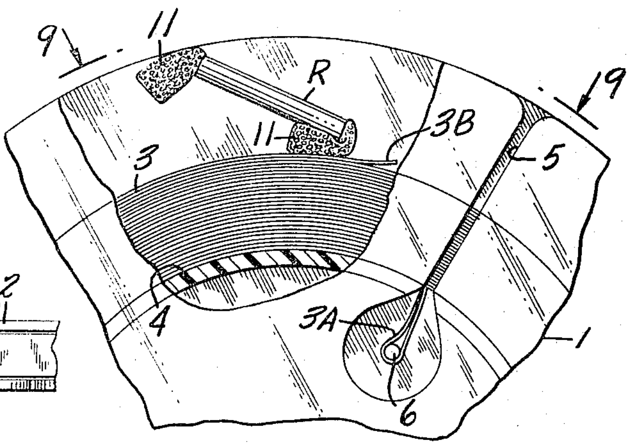
FIG. 7 is a view similar to FIG. 6, but showing use of the tape retainer with a reel which is only approximately half filled with tape.
Figures 6, 8:
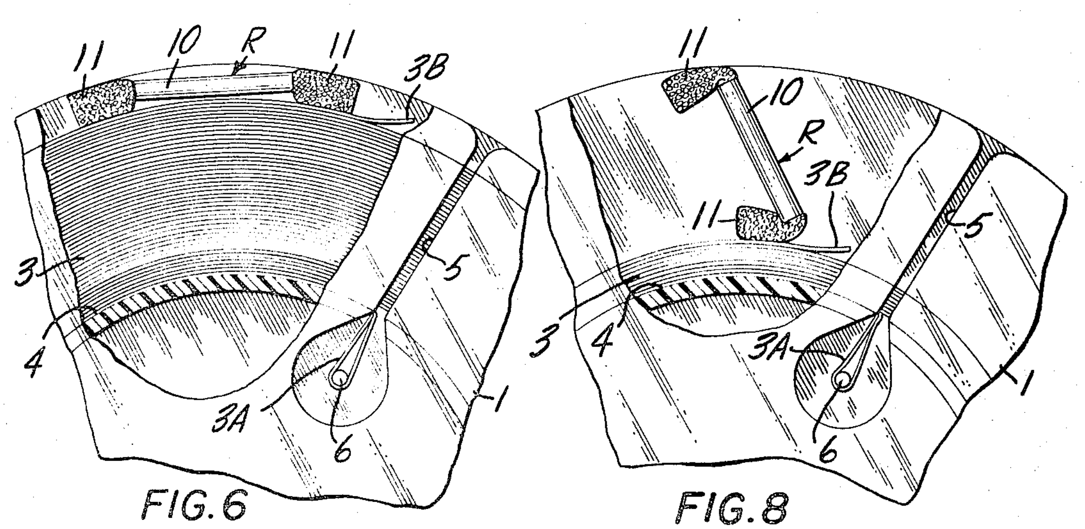
FIG. 6 is a fragmentary side view of a tape reel with a portion broken away to show a tape retainer in use with a tape that substantially fills the reel.
FIG. 8 is a view similar to FIG. 6, but showing use of the tape retainer with a reel containing only a small amount of tape.

The manner in which the tape retainer is used is illustrated in FIGS. 5 to 9. When the tape substantialy fills the reel as illustrated in FIG. 6, the retainer R is pressed in between the flanges of the reel with the stem portion 10 approximately tangent to the outer periphery of the tape roll and with both gripping portions 11 in engagement with the tape. When the reel contains only a medium amount of tape, the retainer R is disposed at an angle as illustrated in FIGS. 5 and 7 with one gripping portion engaging the end portion 3B of the tape while the other gripping portion is near the periphery of the reel where it can be easily gripped to remove the retainer when it is desired to use the tape. When the retainer is introduced at an angle in a direction approximately lengthwise of the stem portion, the inner gripping portion 11 engages the outer end porton 3B of the tape and tends to pull the tape tighter on the reel, while the inner gripping portion of the retainer is bent back underneath the adjacent portion of the stem as illustrated in FIGS. 5 and 7. When in this position, the inner gripping portion by reason of its elasticity continually tries to straighten out, and thereby continues to exert a pull on the tape so as to hold it tight. When there is only a small amount of tape on the reel, the retainer is positioned at a somewhat steeper angle as illustrated in FIG. 8. One of the gripping portions 11 is folded and is in engagement with the tape while the other gripping portion is near the periphery of the reel so that it can be easily gripped to remove the retainer. The length of the retainer is such that even when there is only a small amount of tape on the reel, and outer end of the retainer is near the periphery of the reel for easy accessibility.

While preferred embodiments of my invention have been shown by way of example in the drawings, and particularly described, it will be understood that the invention is in no way limited to these embodiments.

What I claim is:

1. A retainer for retaining tape on a reel having spaced flanges, said retainer comprising a stem portion and gripping portions at opposite ends of said stem portion, said stem portion having a transverse dimension less than the space between said flanges of the reel and said gripping portions being elastically compressible and having in uncompressed condition a transverse dimension greater than the space between said flanges, with the characteristic of gripping said flanges and tape when compressed between said flanges.

2. A retainer according to claim 1, in which each said gripping portion has a length approximately half the length of the stem portion.

3. A retainer according to claim 1, in which said gripping portions are of rectangular cross sectional shape in uncompressed condition.

4. A retainer according to claim 1, in which said stem portion is tubular and in which both of said gripping portions comprise an integral length of elastically compressible material a central portion of which is confined in said tubular stem portion and end portions of which extend beyond the opposite ends of said stem portion to provide said gripping portions.

5. A retainer according to claim 1, in which said stem portion is of round cross section.

6. A retainer according to claim 1, in which said stem portion bears identifying indicia.

7. A retainer according to claim 1, in which said gripping portions are of elastic sponge material.

8. A retainer according to claim 7, in which said sponge material is an elastomeric foam.

9. A retainer according to claim 7, in which said stem portion and both said gripping portions comprise an integral length of said sponge material a central portion of which is compressed and stiffened to provide said stem portion and end portions of which provide said gripping portions.

10. A retainer for retaining tape on a reel having spaced flanges, said retainer being a unitary structure comprising a manipulating stem portion having a transverse dimension less than the space between said flanges of the reel and a gripping portion of elastomeric foam material which is elastically compressible and in uncompressed condition, has a transverse dimension greater than the space between said flanges, said gripping portion being compressed between said flanges and resistently engaging said flanges and tape to secure said tape against unwinding.

No references cited.

JOSEPH R. LECLAIR, *Primary Examiner.*

J. M. CASKIE, *Examiner.*